(12) United States Patent
Sabouri-Sichani et al.

(10) Patent No.: US 12,477,622 B2
(45) Date of Patent: Nov. 18, 2025

(54) OPTIMIZING SWITCHING OF ACTIVE NETWORK CONNECTION FOR A TERMINAL DEVICE

(71) Applicant: Nokia Technologies Oy, Espoo (FI)

(72) Inventors: Faranaz Sabouri-Sichani, Aalborg (DK); Philippe Godin, Versailles (FR); Srinivasan Selvaganapathy, Bangalore (IN); Laura Luque Sanchez, Nibe (DK)

(73) Assignee: Nokia Technologies Oy, Espoo (FI)

( * ) Notice: Subject to any disclaimer, the term of this patent is extended or adjusted under 35 U.S.C. 154(b) by 504 days.

(21) Appl. No.: 17/963,053

(22) Filed: Oct. 10, 2022

(65) Prior Publication Data

US 2023/0121417 A1     Apr. 20, 2023

(30) Foreign Application Priority Data

Oct. 18, 2021   (IN) .............................. 202141047173

(51) Int. Cl.
   *H04W 76/00* (2018.01)
   *H04W 76/20* (2018.01)
   *H04W 76/30* (2018.01)
   *H04W 76/38* (2018.01)

(52) U.S. Cl.
   CPC ........... *H04W 76/30* (2018.02); *H04W 76/20* (2018.02); *H04W 76/38* (2018.02)

(58) Field of Classification Search
   CPC ..... H04W 76/30; H04W 76/20; H04W 76/38; H04W 76/16; H04W 76/19; H04W 76/27; H04W 36/00725
   See application file for complete search history.

(56) References Cited

U.S. PATENT DOCUMENTS

| | | | |
|---|---|---|---|
| 2022/0210632 A1* | 6/2022 | Tseng | H04W 8/183 |
| 2024/0196468 A1* | 6/2024 | Velev | H04W 76/15 |
| 2024/0260133 A1* | 8/2024 | Kim | H04W 88/06 |
| 2024/0334294 A1* | 10/2024 | Bergström | H04W 24/10 |

OTHER PUBLICATIONS

"3rd Generation Partnership Project; Technical Specification Group Radio Access Network; NR; Radio Resource Control (RRC) protocol specification (Release 16)", 3GPP TS 38.331, V16.5.0, Jun. 2021, pp. 1-959.

(Continued)

*Primary Examiner* — Lakeram Jangbahadur
(74) *Attorney, Agent, or Firm* — Nokia Technologies Oy

(57) ABSTRACT

A method comprising transmitting a configuration of a default time period, wherein the default time period is for allowing a terminal device to consider a request for leaving an active network connection to a first network as accepted by the first network if the first network does not send a response within that the default period, to the terminal device, receiving a first message, from the terminal device, indicating a request to leave the active network connection, determining an overriding condition that overrides the default time period for leaving the active network condition and transmitting, to the terminal device, a second message comprising the overriding condition.

16 Claims, 4 Drawing Sheets

(56) References Cited

OTHER PUBLICATIONS

"Revised SID: Study on system enablers for multi-SIM devices", TSG SA Meeting #SP-83, SP-190248, Agenda: 17B.19, SA WG2, Mar. 20-22, 2019, 4 pages.

"3rd Generation Partnership Project; Technical Specification Group Services and System Aspects; Study on Support for Multi-USIM Devices (Release 17)", 3GPP TR 22.834, V17.2.0, Dec. 2019, pp. 1-17.

"3rd Generation Partnership Project; Technical Specification Group Services and System Aspects; Study on system enablers for devices having multiple Universal Subscriber Identity Modules (USIM) (Release 17)", 3GPP TR 23.761, V17.0.0, Jun. 2021, pp. 1-111.

"New WID: Support for Multi-SIM devices in Rel-17", 3GPP TSG RAN Meeting #86, RP-193263, Agenda: 9.1.2, vivo, Dec. 9-12, 2019, 5 pages.

"LG A290 Triple SIM", LG, Retrieved on Oct. 17, 2022, Webpage available at: https://www.lg.com/ae/mobile-phones/lg-A290.

"IEEE 802.11", Wikipedia, Retrieved on Oct. 17, 2022, Webpage available at : https://en.wikipedia.org/wiki/IEEE_802.11.

"IEEE 802.15", Wikipedia, Retrieved on Oct. 17, 2022, Webpage available at : https://en.wikipedia.org/wiki/IEEE_802.15.

* cited by examiner

OPTIMIZING SWITCHING OF ACTIVE NETWORK CONNECTION FOR A TERMINAL DEVICE

RELATED APPLICATION

This application claims priority from Indian provisional patent application no. 202141047173 filed on Oct. 18, 2021, the contents of which is hereby incorporated by reference in its entirety.

FIELD

The following exemplary embodiments relate to wireless communication and to optimizing switching from one active network connection to another when a terminal device is capable of supporting multiple simultaneous cellular network connections.

BACKGROUND

Cellular communication enables various mobile use cases to be implemented. There are various network providers that provide cellular networks to which a mobile device can connect to using a network subscription. Some mobile devices, which may also be called as terminal devices, can support multiple simultaneous network subscriptions. Thus, such a terminal device needs to be able to share the resources of the terminal device between the subscriptions in an optimal manner.

BRIEF DESCRIPTION

The scope of protection sought for various embodiments is set out by the independent claims. The exemplary embodiments and features, if any, described in this specification that do not fall under the scope of the independent claims are to be interpreted as examples useful for understanding various embodiments of the invention.

According to a first aspect there is provided an apparatus comprising at least one processor, and at least one memory including a computer program code, wherein the at least one memory and the computer program code are configured, with the at least one processor, to cause the apparatus to receive a default time period, wherein the default time period is for allowing the apparatus to consider a request for leaving an active network connection to a first network as accepted by the first network if a response is not received, by the apparatus, from the first network within the default time period, determine to leave the active network connection to the first network when having a connection that is idle or inactive to a second network simultaneously with the active connection to the first network, transmit a first message, comprising a request regarding the determination to leave the active network connection, to an access node comprised in the first network, receive, from the access node, a second message comprising an overriding condition for leaving that replaces the default time period for leaving the active network connection to the first network, and leave the active network connection upon meeting the overriding condition for leaving.

According to a second aspect there is provided an apparatus comprising means for receiving a default time period, wherein the default time period is for allowing the apparatus to consider a request for leaving an active network connection to a first network as accepted by the first network if a response is not received, by the apparatus, from the first network within the default time period, determining to leave the active network connection to the first network when having a connection that is idle or inactive to a second network simultaneously with the active connection to the first network, transmitting a first message, comprising a request regarding the determination to leave the active network connection, to an access node comprised in the first network, receiving, from the access node, a second message comprising an overriding condition for leaving that replaces the default time period for leaving the active network connection to the first network, and leaving the active network connection upon meeting the overriding condition for leaving.

According to a third aspect there is provided a method comprising receiving a default time period, wherein the default time period is for allowing the apparatus to consider a request for leaving an active network connection to a first network as accepted by the first network if a response is not received, by the apparatus, from the first network within the default time period, determining to leave the active network connection to the first network when having a connection that is idle or inactive to a second network simultaneously with the active connection to the first network, transmitting a first message, comprising a request regarding the determination to leave the active network connection, to an access node comprised in the first network, receiving, from the access node, a second message comprising an overriding condition for leaving that replaces the default time period for leaving the active network connection to the first network, and leaving the active network connection upon meeting the overriding condition for leaving.

According to a fourth aspect there is provided a computer program comprising instructions for causing an apparatus to perform at least the following: receive a default time period, wherein the default time period is for allowing the apparatus to consider a request for leaving an active network connection to a first network as accepted by the first network if a response is not received, by the apparatus, from the first network within the default time period, determine to leave the active network connection to the first network when having a connection that is idle or inactive to a second network simultaneously with the active connection to the first network, transmit a first message, comprising a request regarding the determination to leave the active network connection, to an access node comprised in the first network, receive, from the access node, a second message comprising an overriding condition for leaving that replaces the default time period for leaving the active network connection to the first network, and leave the active network connection upon meeting the overriding condition for leaving.

According to a fifth aspect there is provided a computer program product comprising instructions for causing an apparatus to perform at least the following: receive a default time period, wherein the default time period is for allowing the apparatus to consider a request for leaving an active network connection to a first network as accepted by the first network if a response is not received, by the apparatus, from the first network within the default time period, determine to leave the active network connection to the first network when having a connection that is idle or inactive to a second network simultaneously with the active connection to the first network, transmit a first message, comprising a request regarding the determination to leave the active network connection, to an access node comprised in the first network, receive, from the access node, a second message comprising an overriding condition for leaving that replaces the default time period for leaving the active network connection to the first network, and leave the active network connection upon meeting the overriding condition for leaving.

According to a sixth aspect there is provided a computer program comprising instructions stored thereon for performing at least the following: receiving a default time period, wherein the default time period is for allowing the apparatus to consider a request for leaving an active network connection to a first network as accepted by the first network if a response is not received, by the apparatus, from the first network within the default time period, determining to leave the active network connection to the first network when having a connection that is idle or inactive to a second network simultaneously with the active connection to the first network, transmitting a first message, comprising a request regarding the determination to leave the active network connection, to an access node comprised in the first network, receiving, from the access node, a second message comprising an overriding condition for leaving that replaces the default time period for leaving the active network connection to the first network, and leaving the active network connection upon meeting the overriding condition for leaving.

According to a seventh aspect there is provided a non-transitory computer readable medium comprising program instructions for causing an apparatus to perform at least the following: receive a default time period, wherein the default time period is for allowing the apparatus to consider a request for leaving an active network connection to a first network as accepted by the first network if a response is not received, by the apparatus, from the first network within the default time period, determine to leave the active network connection to the first network when having a connection that is idle or inactive to a second network simultaneously with the active connection to the first network, transmit a first message, comprising a request regarding the determination to leave the active network connection, to an access node comprised in the first network, receive, from the access node, a second message comprising an overriding condition for leaving that replaces the default time period for leaving the active network connection to the first network, and leave the active network connection upon meeting the overriding condition for leaving.

According to an eight aspect there is provided non-transitory computer readable medium comprising program instructions stored thereon for performing at least the following: receiving a default time period, wherein the default time period is for allowing the apparatus to consider a request for leaving an active network connection to a first network as accepted by the first network if a response is not received, by the apparatus, from the first network within the default time period, determining to leave the active network connection to the first network when having a connection that is idle or inactive to a second network simultaneously with the active connection to the first network, transmitting a first message, comprising a request regarding the determination to leave the active network connection, to an access node comprised in the first network, receiving, from the access node, a second message comprising an overriding condition for leaving that replaces the default time period for leaving the active network connection to the first network, and leaving the active network connection upon meeting the overriding condition for leaving.

According to a ninth aspect there is provided an apparatus comprising at least one processor, and at least one memory including a computer program code, wherein the at least one memory and the computer program code are configured, with the at least one processor, to cause the apparatus to transmit a configuration of a default time period, wherein the default time period is for allowing a terminal device to consider a request for leaving an active network connection to a first network as accepted by the first network if the first network does not send a response within that the default period, to the terminal device, receive a first message, from the terminal device, indicating a request to leave the active network connection, determine an overriding condition that overrides the default time period for leaving the active network condition and transmit, to the terminal device, a second message comprising the overriding condition.

According to a tenth aspect there is provided an apparatus comprising means for transmitting a configuration of a default time period, wherein the default time period is for allowing a terminal device to consider a request for leaving an active network connection to a first network as accepted by the first network if the first network does not send a response within that the default period, to the terminal device, receiving a first message, from the terminal device, indicating a request to leave the active network connection, determining an overriding condition that overrides the default time period for leaving the active network condition and transmitting, to the terminal device, a second message comprising the overriding condition.

According to an eleventh aspect there is provided a method comprising transmitting a configuration of a default time period, wherein the default time period is for allowing a terminal device to consider a request for leaving an active network connection to a first network as accepted by the first network if the first network does not send a response within that the default period, to the terminal device, receiving a first message, from the terminal device, indicating a request to leave the active network connection, determining an overriding condition that overrides the default time period for leaving the active network condition and transmitting, to the terminal device, a second message comprising the overriding condition.

According to a twelfth aspect there is provided a computer program comprising instructions for causing an apparatus to perform at least the following: transmit a configuration of a default time period, wherein the default time period is for allowing a terminal device to consider a request for leaving an active network connection to a first network as accepted by the first network if the first network does not send a response within that the default period, to the terminal device, receive a first message, from the terminal device, indicating a request to leave the active network connection, determine an overriding condition that overrides the default time period for leaving the active network condition and transmit, to the terminal device, a second message comprising the overriding condition.

According to a thirteenth aspect there is provided a computer program product comprising instructions for causing an apparatus to perform at least the following: transmit a configuration of a default time period, wherein the default time period is for allowing a terminal device to consider a request for leaving an active network connection to a first network as accepted by the first network if the first network does not send a response within that the default period, to the terminal device, receive a first message, from the terminal device, indicating a request to leave the active network connection, determine an overriding condition that overrides the default time period for leaving the active network condition and transmit, to the terminal device, a second message comprising the overriding condition.

According to a fourteenth aspect there is provided a computer program comprising instructions stored thereon for performing at least the following: transmitting a configuration of a default time period, wherein the default time period is for allowing a terminal device to consider a request for leaving an active network connection to a first network as accepted by the first network if the first network does not send a response within that the default period, to the terminal device, receiving a first message, from the terminal device, indicating a request to leave the active network connection, determining an overriding condition that overrides the default time period for leaving the active network condition and transmitting, to the terminal device, a second message comprising the overriding condition.

According to a fifteenth aspect there is provided a non-transitory computer readable medium comprising program instructions for causing an apparatus to perform at least the following: transmit a configuration of a default time period, wherein the default time period is for allowing a terminal device to consider a request for leaving an active network connection to a first network as accepted by the first network if the first network does not send a response within that the default period, to the terminal device, receive a first message, from the terminal device, indicating a request to leave the active network connection, determine an overriding condition that overrides the default time period for leaving the active network condition and transmit, to the terminal device, a second message comprising the overriding condition.

According to an sixteenth aspect there is provided a non-transitory computer readable medium comprising program instructions stored thereon for performing at least the following: transmitting a configuration of a default time period, wherein the default time period is for allowing a terminal device to consider a request for leaving an active network connection to a first network as accepted by the first network if the first network does not send a response within that the default period, to the terminal device, receiving a first message, from the terminal device, indicating a request to leave the active network connection, determining an overriding condition that overrides the default time period for leaving the active network condition and transmitting, to the terminal device, a second message comprising the overriding condition.

LIST OF DRAWINGS

In the following, the exemplary embodiments will be described in greater detail with reference to the embodiments and the accompanying drawings, in which FIG. 1 illustrates an exemplary embodiment of a network.

DESCRIPTION OF EMBODIMENTS

Figure 1:
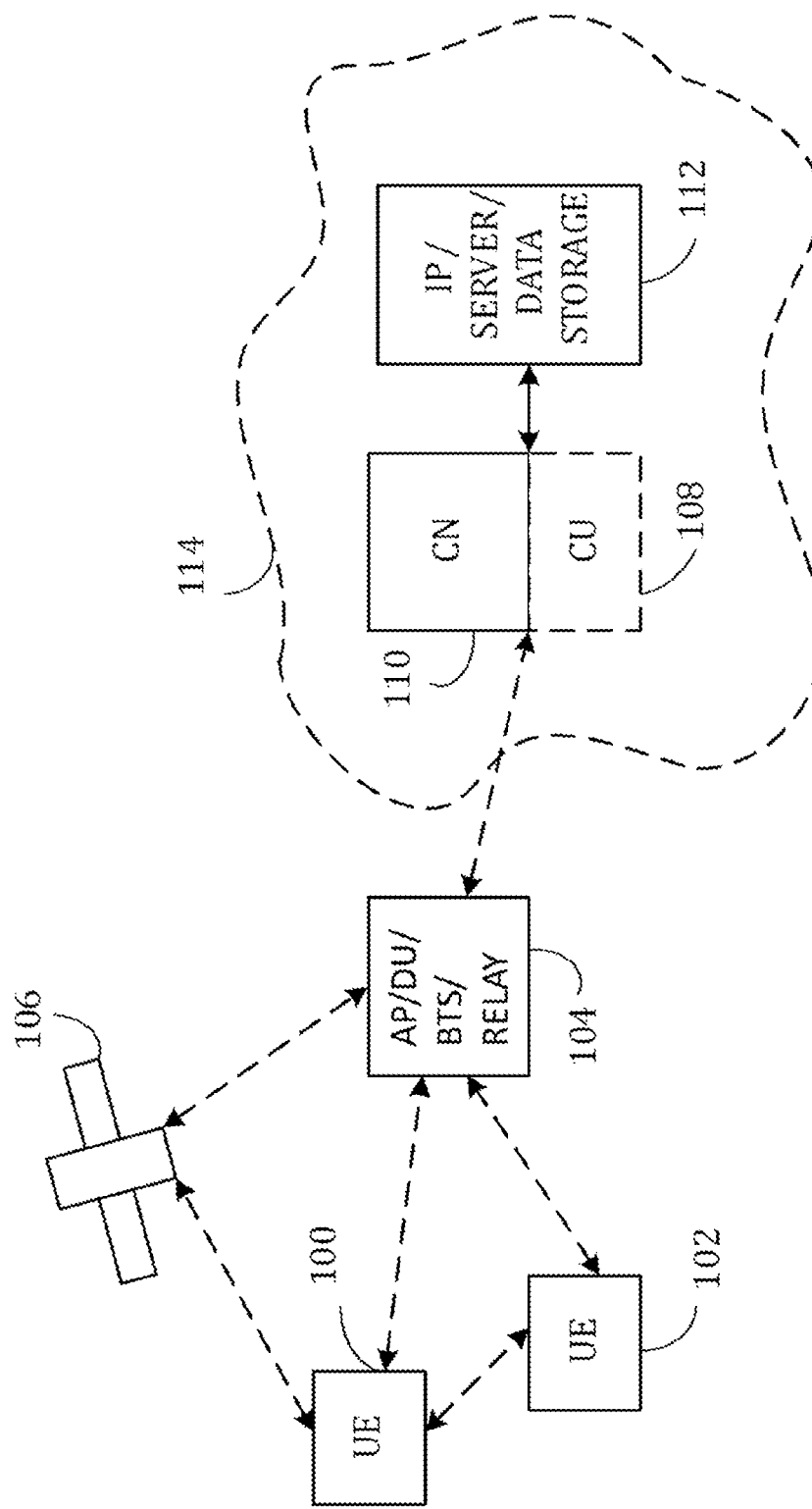

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. The above-described embodiments of the circuitry may also be considered as embodiments that provide means for carrying out the embodiments of the methods or processes described in this document.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via any suitable means. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments described herein may be implemented in a communication system, such as in at least one of the following: Global System for Mobile Communications (GSM) or any other second generation cellular communication system, Universal Mobile Telecommunication System (UMTS, 3G) based on basic wideband-code division multiple access (W-CDMA), high-speed packet access (HSPA), Long Term Evolution (LTE), LTE-Advanced, a system based on IEEE 802.11 specifications, a system based on IEEE 802.15 specifications, and/or a fifth generation (5G) mobile or cellular communication system. The embodiments are not, however, restricted to the system given as an example but a person skilled in the art may apply the solution to other communication systems provided with necessary properties.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may comprise also other functions and structures than those shown in FIG. 1. The example of FIG. 1 shows a part of an exemplifying radio access network.

FIG. 1 shows terminal devices 100 and 102 configured to be in a wireless connection on one or more communication channels in a cell with an access node (such as (e/g)NodeB) 104 providing the cell. The access node 104 may also be referred to as a node. The physical link from a terminal device to a (e/g)NodeB is called uplink or reverse link and the physical link from the (e/g)NodeB to the terminal device is called downlink or forward link. It should be appreciated that (e/g)NodeBs or their functionalities may be implemented by using any node, host, server or access point etc. entity suitable for such a usage. It is to be noted that although one cell is discussed in this exemplary embodiment, for the sake of simplicity of explanation, multiple cells may be provided by one access node in some exemplary embodiments.

A communication system may comprise more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The (e/g)NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side may be a serving gateway (S-GW, routing and forwarding user data packets), packet data network gateway (P-GW), for providing connectivity of terminal devices (UEs) to external packet data networks, or mobile management entity (MME), etc.

The terminal device (also called UE, user equipment, user terminal, user device, etc.) illustrates one type of an apparatus to which resources on the air interface are allocated and assigned, and thus any feature described herein with a terminal device may be implemented with a corresponding apparatus, such as a relay node. An example of such a relay node is a layer 3 relay (self-backhauling relay) towards the base station. Another example of such a relay node is a layer 2 relay. Such a relay node may contain a terminal device part and a Distributed Unit (DU) part. A CU (centralized unit) may coordinate the DU operation via F1AP-interface for example.

The terminal device may refer to a portable computing device that includes wireless mobile communication devices operating with or without a subscriber identification module (SIM), or an embedded SIM, eSIM, including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. A vehicle that is capable of connecting to cellular communication network may also be considered as a terminal device. It should also be appreciated that a user device may also be an exclusive or a nearly exclusive uplink only device, of which an example is a camera or video camera loading images or video clips to a network. A terminal device may also be a device having capability to operate in Internet of Things (IoT) network which is a scenario in which objects are provided with the ability to transfer data over a network without requiring human-to-human or human-to-computer interaction. The terminal device may also utilise cloud. In some applications, a terminal device may comprise a small portable device with radio parts (such as a watch, earphones or eyeglasses) and the computation is carried out in the cloud. The terminal device (or in some embodiments a layer 3 relay node) is configured to perform one or more of user equipment functionalities.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications such as (massive) machine-type communications (mMTC), including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G may require bringing the content close to the radio which may lead to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, and/or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology that may be used includes for example Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling or service availability in areas that do not have terrestrial coverage. Satellite communication may utilise geostationary earth orbit (GEO) satellite systems, but also low earth orbit (LEO) satellite systems, for example, mega-constellations (systems in which hundreds of (nano) satellites are deployed). A satellite 106 comprised in a constellation may carry a gNB, or at least part of the gNB, that create on-ground cells. Alternatively, a satellite 106 may be used to relay signals of one or more cells to the Earth. The on-ground cells may be created through an on-ground relay node 104 or by a gNB located on-ground or in a satellite or part of the gNB may be on a satellite, the DU for example, and part of the gNB may be on the ground, the CU for example.

It is to be noted that the depicted system is an example of a part of a radio access system and the system may comprise a plurality of (e/g)NodeBs, the terminal device may have an access to a plurality of radio cells and the system may comprise also other apparatuses, such as physical layer relay nodes or other network elements, etc. At least one of the (e/g)NodeBs may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. In some exemplary embodiments, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. A network which is able to use "plug-and-play" (e/g)NodeBs, may include, in addition to Home (e/g)NodeBs (H(e/g) nodeBs), a home node B gateway, or HNB-GW (not shown in FIG. 1). A HNB Gateway (HNB-GW), which may be installed within an operator's network may aggregate traffic from a large number of HNBs back to a core network.

A terminal device may have capability of connecting to a plurality of network subscriptions simultaneously. For example, the terminal device may have simultaneous subscriptions to two or more networks that follow 3GPP or 3GPP2 standards. Such subscriptions may be via international mobile subscriber identities, IMSI for evolve packet system, EPS. IMSI is a unique ID that globally identifies a mobile subscriber and the IMSI may be comprised in a USIM card comprised in a terminal device. At least one other subscription may be via subscription permanent identifier, SUPI, in case of 5G system, 5GS that may also be comprised in USIM card comprised in the terminal device. Each network subscription may be associated with a subscription belonging to the same or different mobile network operator, MNO or, mobile virtual network operator, MVNO. The terminal device may thus be a multi-USIM, MUSIM, device.

Depending on the capabilities of the MUSIM device, it may handle the multiple network subscriptions in various manners. For example, if there are two simultaneous network subscriptions and the terminal device comprises two USIMs, the behavior of the terminal device with respect to the network subscriptions may depend on connectivity resources, that may be understood to comprise software and/or hardware resources required to connect the terminal device to a network corresponding to a network subscription, comprised in the terminal device. For example, if connectivity resources of the terminal device comprise a single transmitter and a single receiver, then the terminal device may receive traffic from only one network at a time and the terminal device may transmit traffic to only one network at a time as well. On the other hand, if the connectivity resources of the terminal device comprise two receivers and one transmitter, then the terminal device may receive traffic from two networks simultaneously but transmit traffic only to one network at a time. Further, if the connectivity resources of the terminal device comprise two transmitters and two receivers, then the terminal device may receive traffic from two networks simultaneously and also transmit traffic to two networks simultaneously.

It is to be noted that the number of USIMs a terminal device support may also be more than two, for example three USIMs may be supported.

A terminal device that is a MUSIM terminal device may have limited hardware capabilities for performing simultaneous receive, Rx, and/or transmit, Tx, operations on all USIMs. For example, the terminal device may comprise two USIMs, and the terminal device is in an RRC_CONNECTED state in a first network, NW, corresponding to the first USIM and in an RRC_idle or RRC_inactive state in a second NW corresponding to the second USIM. The terminal device may then need to leave the first network to obtain some services from the second network. If the activity required to obtain a service from the second network is short enough for the terminal device to return to the first network after a completion of the procedure for the service, the terminal device may not need to leave the RRC connection in the first network, but the terminal device may request one or more scheduled gaps from the first network instead. Yet, if the terminal device needs to move to RRC_CONNECTED state for the second network, then it needs to leave the RRC Connection to the first network.

In case the terminal device needs to move to RRC_CONNECTED state for the second network, and it needs to leave the RRC Connection to the first network, there is a need for mechanism for the terminal device to notify the first network of the upcoming switch from the first network to the second network. It is to be noted though that at least in some exemplary embodiments the first network is a 5G network and the second network may be a 5G network or a 4G network. Thus, there is a need for solutions and signaling for the terminal device to request RRC switching from the first network to the second network without leaving the RRC connection or RRC switching with leaving RRC connection to the first network. The exemplary embodiment described herein exemplify such solutions and signaling. In some exemplary embodiments, a UEAssistanceInformation message may be extended for switching notification in both network switching procedures: for leaving RRC_CONNECTED state and without leaving RRC_CONNECTED state. Also, an RRC timer for a default time period that may be used for the terminal device to leave a RRC_CONNECTED state to the first network without a response is defined. That is, if a network response message has not been received within a certain, pre-determined time period after the terminal device has sent the network switching notification message, which may be a request for leaving the active network connection to the first network, the terminal device may utilize the default time period, which in the context of this document is referred to as a MUSIMLeaveTime. This time period, the MUSIMLeaveTime may be configured by a network and a terminal device may then use it as a timer to leave RRC_CONNECTED without a response from the network to its request for leaving. In other words, the MUSIMLeaveTime can be considered as a default time period after which the terminal device may consider its request for leaving the active network connection as accepted if no response is received from the network during that default time period. The MUSIMLeaveTime may be the one-size-fits all. However, depending on the current situation for the terminal device and traffic, the duration that is required to stay on a serving gNB of the first network may vary. It may also be advantageous—in order to save signalling—to set the MUSIMLeaveTime, to a small value which enables the network to save the response in the majority of cases where it accepts the request. However, there may be some situations in which the network would in contrast need the terminal device to stay connected longer that the timer MUSIMLeaveTime, e.g. depending on the situation of the terminal device or traffic at the time of the terminal device's request to leave.

In some exemplary embodiments, the network, as a response to receiving the leave request, may send, to the terminal device, a message that postpones the release of the terminal device beyond the time period that is pre-defined, that is, beyond the MUSIMLeaveTime. Additionally, or alternatively, other control conditions for the terminal device to leave may be included in the message sent as a response to the leave request.

In a further exemplary embodiment, the network may, in response to receiving the leave request, transmit to the terminal device a message that rejects the leave request. The rejection may be a dynamic rejection that redefines the time period after which the terminal device may leave.

The timer MUSIMLeaveTime may be provided to the terminal device when the terminal device is moved to RRC_CONNECTED state, for example at a RRC Connection setup with the initial configuration. The network may determine the size for the MUSIMLeaveTime. The determination may be performed in any suitable manner, for example, by configuring it from a list of specified values.

If the network then accepts the leave request it received from the terminal device, the network may indicate by transmitting a UEAssistanceInformation, UAI, message in which the acceptance to the received request for leaving is indicated, and correspondingly the terminal device may move to RRC_IDLE after the expiry of MUSIMLeaveTime without any further exchange of signalling such as RRCRelease. In other words, the terminal device may leave an active connection to the network without receiving a response regarding the request for leaving from the network.

Alternatively, the network may decide to change the default behaviour by responding to the UAI message with message that indicates new conditions for leaving. The new conditions are overriding conditions with respect to the default time period for leaving. For example, the network may transmit a message, such as a RRCReconfiguration message, that indicates a new time period for waiting during which the terminal device stays connected to the network and after which the terminal device is allowed to leave without receiving a response from the network to its request for the leaving the active network connection. Additionally, or alternatively, the message may configure a further condition for leaving the network. The further condition may be for example to wait for a completion of a mobile procedure such as a pending or requested handover, or a radio link failure recovery. In case the new time period and the further condition are both provided in the message, the terminal device may leave for example at the earliest, i.e. whichever happens earlier, or alternatively, when the further condition is met and the new time period has passed. The first network may determine, and configure accordingly, if both conditions are to be met before leaving or if the terminal device may leave at the earliest possible moment. The message may also provide a single aperiodic gap configuration. In other words, the message comprising an overriding condition for leaving may further comprise an aperiodic gap. Start of the gap may be conditional and the end of the gap may be fixed such that it is independent of the start of the gap. The gap may turn to the terminal device being moved to RRC_IDLE in case the terminal device does not return, that is, does not use a Configured Grant at the expected end of the gap. Alternatively, in some exemplary embodiments, the end of the gap may turn to RRC_INACTIVE if the terminal device has provided this as preference in its UAI.

Alternatively, or additionally, the network may send an RRCRelease message to the terminal device which includes again the MUSIMWaitTime such that an IE may be newly added to RRCRelease message and the new timer may be specified. Upon the expiry of the newly added timer the terminal device may then move to RRC_IDLE state.

Figure 2:
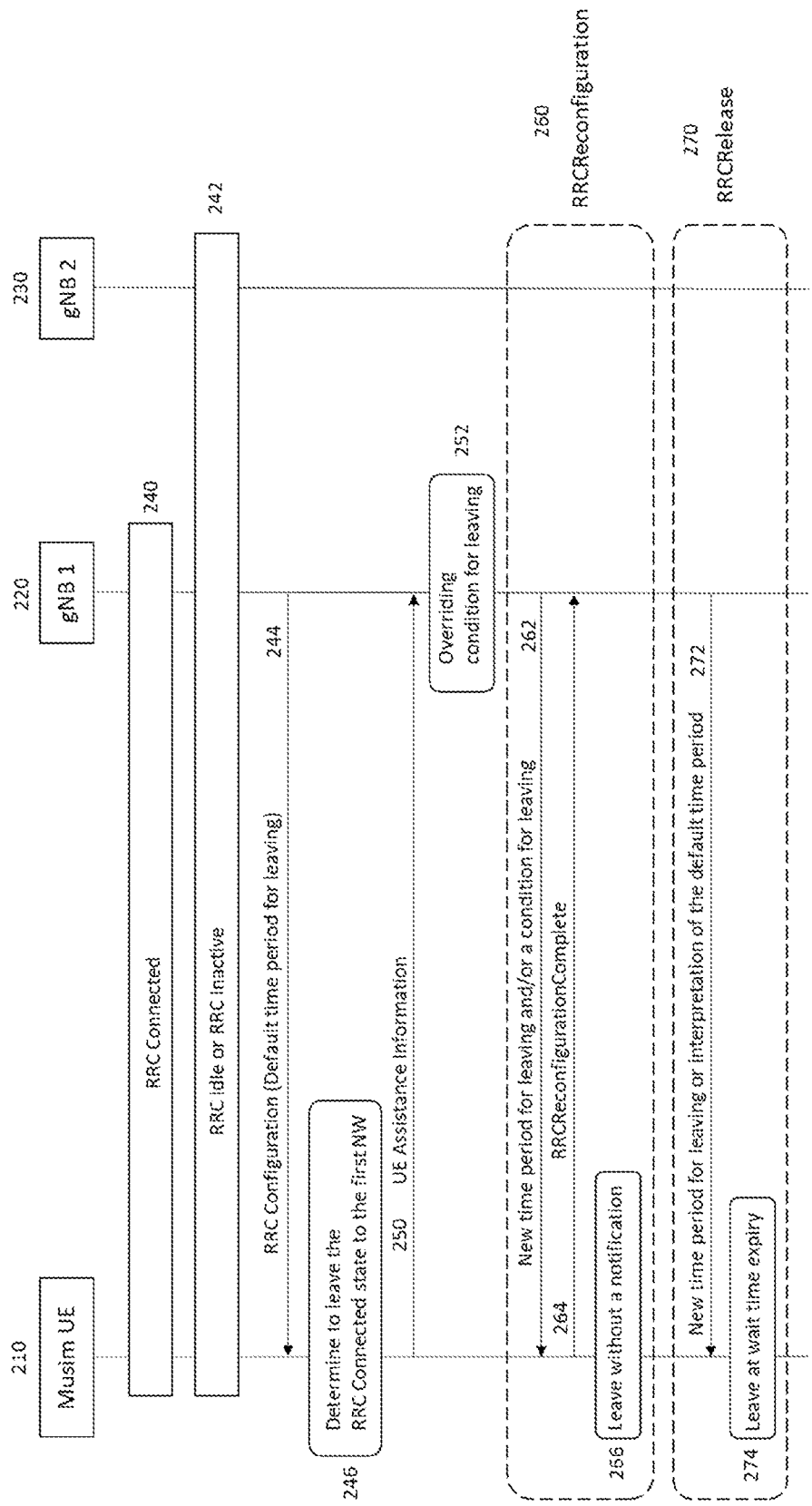
FIG. 2 and FIG. 3 illustrate signaling according to an exemplary embodiment.

FIG. 2 illustrates an exemplary embodiment of a terminal device transmitting a leave request to a first network and the first network responding by transmitting a message comprising an overriding condition that overrides the default time period which is a time period for allowing the terminal device to consider its request for leaving as accepted by the first network if the network does not send a response within the default time period. It is to be noted that although the terminal device in this exemplary embodiment is a MUSIM terminal device that has two different network subscriptions, in some other exemplary embodiments the terminal device could have a different amount of network subscriptions.

In this exemplary embodiment the terminal device 210 is in an RRC_CONNECTED state 240 to an access node, that in this exemplary embodiment is a gNB 220 comprised in the first network. In other words, the terminal device 210 has an active connection to the gNB 220 and thereby to the first network. The terminal device 210 is simultaneously in a RRC_IDLE or in a RRC_INACTIVE state 242 to a second access node, which in this exemplary embodiment is a gNB 230 that is comprised in the second network. In other words, the terminal device is in a connection that is idle or inactive to the second network. It is to be noted that in some other exemplary embodiments the second access node could be another type of access node such as an eNB.

In this exemplary embodiment, the gNB 220 transmits a message that comprises RRC_Configuration with a default time period for leaving without receiving a response to a request for leaving an active network connection to the first network. In other words, the gNB 220 transmits a configuration message 244 for a MUSIMLeaveTime and this configuration message 244 is received by the terminal device 210. As the terminal device 210 determines 246 to leave the active connection to the first network, the terminal device 210 determines 246 that the active connection is to be switched to the second network. Thus, the terminal device 210 transmits a message 250 to the gNB 220 comprising a request to leave the active connection to the first network. The message 250 may be a provided in a UE Assistance Information signal that comprises the request of the terminal device for leaving the active network connection and may additionally comprise a state preference.

Upon receiving the message 250, the gNB 220 determines 252 if the terminal device 210 should wait for longer than the default time period, the MUSIMLeaveTime, before leaving the active connection and/or perform the leaving depending on some other condition. It is to be noted though that although the gNB 220 may determines in this exemplary embodiment if the terminal device 210 should wait for a longer period of time than the default time period before leaving the active network connection, in some other exemplary embodiments it may also be determined that the time the terminal device should wait before leaving is to be shorter instead of longer than the default time period. In other words, the gNB 220 determines 252 if the default time period for leaving is to be overridden by another condition for leaving. As such, upon reception of the UEAssistanceInformation with RRC LEAVE request, the first network may evaluate a possible action with the most optimal usage of the resources of the terminal device 210 on both USIMs and the least amount of signalling.

If an overriding condition for leaving is not determined to be required, then the terminal device 210 may leave without receiving a response regarding the leaving by the end of the default time period for waiting, that is, by the end of the MUSIMLeaveTime. In such a case the network does not have to transmit any further signalling.

Alternatively, if it is determined, by the first access node that in this exemplary embodiment is the gNB 220, or by the first network or by a combination of both, that the MUSIMLeaveTime should be changed to be a time period of a different duration, the gNB 220 may transmit an RRCRelease message that comprises the time period of the different duration to override the MUSIMLeaveTime. The different duration may be longer than the MUSIMLeaveTime. Alternatively, the different duration may shorten the time period the terminal device 210 is to wait before leaving the active network connection. This may be the case for example if there is no pending traffic.

As a further alternative, if it is determined, by the first access node that in this exemplary embodiment is the gNB 220, or by the first network or by a combination of both, that there is an overriding condition for the terminal device 210 to leave the active connection to the first network, the overriding condition for leaving is then provided to the terminal device 210 by transmitting a message, by the gNB 220, that the terminal 210 receives. The message may be transmitted using RRCReconfiguration 260 or using RRCRelease 270. It is to be noted that if the message is transmitted using the RRCReconfiguration 260, the message may comprise a new time period that is to override the MUSIMLeaveTime and/or a further condition for leaving while if the message is transmitted using the RRCRelease 270, the message then comprises a new time period that is to override the MUSIMLeaveTime.

If RRCReconfiguration 260 is used, then the gNB 220 transmits a message 262 that comprises a new time period for the terminal device 210 to wait instead of the MUSIMLeaveTime after which the terminal device 210 may leave the active connection to the first network without receiving a response regarding the leaving from the gNB 220. In addition to, or instead of, the message 262 comprising the new time period for waiting, the message 262 may comprise a further condition for the terminal device 210 to leave 266 the active network connection to the first network without receiving a further message regarding the leaving from the gNB 220. The further condition may be such that the leave may occur after a completion of the condition. In case the message 262 comprises both a new time period for waiting and a further condition, the terminal device 210 may leave 266 the active network connection to the first network without receiving a response regarding the leaving from the gNB 220 when either time condition is fulfilled or the new time period expires, depending on which takes place first. This allows the terminal device 210 to leave 266 the active connection to the network at the earliest possible moment. Thus, after receiving the message 262 from the gNB 220, the terminal device 210 transmits an RRCReconfigurationComplete message 264, which may be considered as a message to acknowledge the overriding conditions, to the gNB 220 and then leaves 266 the active connection to the first network at the earliest possible moment without receiving a further message regarding the leaving. Alternatively, the leaving may take place when the new time period expires, and the further conditions is also fulfilled. In other words, there is an alternative to leave at the earliest possible moment and another alternative to leave when both conditions, the new time period for waiting and the further condition for leaving, are fulfilled. Which alternative is to be used when both a new timer and a further condition are comprised in the RRCReconfiguration 260 message may be determined by the first network.

In case the RRCReconfiguration 260 comprises a new time period and/or a further condition for leaving, the condition may relate to for example an ongoing traffic and the MUSIMLeaveTime is too short to allow completion. Thus, the new time period may allow to postpone the leaving, or instead, the further condition for leaving. The condition may be related to a completion of the ongoing traffic or a procedure for example.

It is also to be noted that if RRCReconfiguration 260 is used, an aperiodic gap may be configured and the aperiodic gap may be followed by implicit release in case the terminal device 210 does not return to the active connection to the first network. If the terminal device 210 fails random access channel, RACH, procedure towards the second network during the aperiodic gap and the terminal device 210 then decides to return to the active connection to the first network, the terminal device may continue with the RRC connection after the aperiodic gap by sending a buffer status report, BSR, or physical uplink control channel, PUCCH, in the next immediate opportunity.

Alternatively, if RRCRelease 270 is used, then the gNB 220 transmits a message 272 that comprises a new time period for the terminal device 210 to wait instead of the MUSIMLeaveTime after which the terminal device 210 may leave 274 the active connection to the first network without receiving a further message regarding the leaving from the gNB 220. Alternatively, the message 272 may comprise a new interpretation of the default time period and once that has passed, the terminal device 210 may leave the active network connection to the first network without receiving a further message regarding the leaving from the first network.

Figure 3:
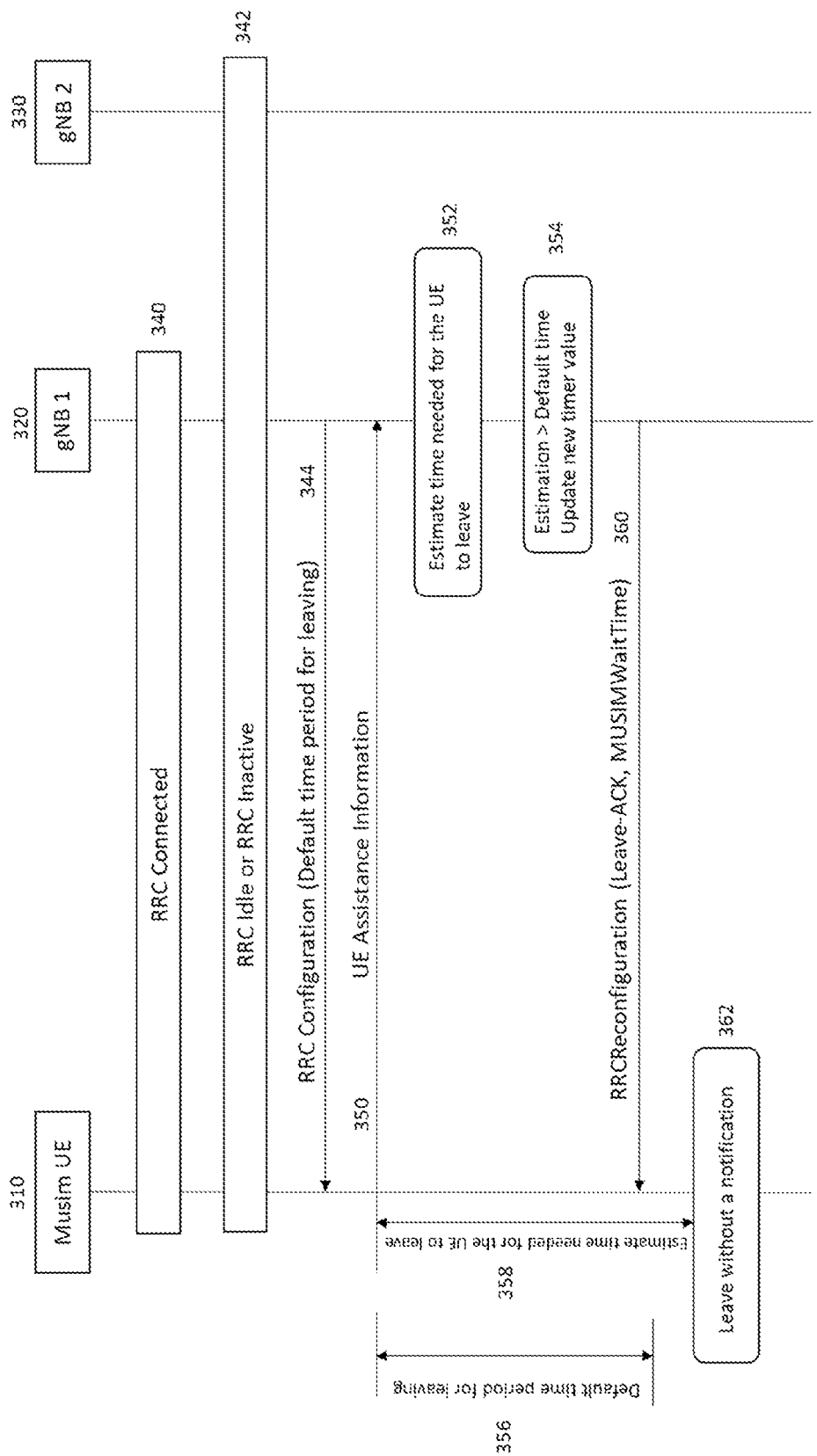

FIG. 3 illustrates an exemplary embodiment of a network deciding to extend a default time period before a terminal device may leave an active connection to the network without receiving a response regarding the leaving. In this exemplary embodiment there is thus a terminal device transmitting a leave request to a first network and the first network responding by transmitting a message comprising an overriding condition that overrides the default time period after which the terminal device is allowed to leave the network. It is to be noted that although the terminal device in this exemplary embodiment is a MUSIM terminal device that has two different network subscriptions, in some other exemplary embodiments the terminal device could have a different amount of network subscriptions.

In this exemplary embodiment the terminal device 310 is in a RRC_CONNECTED state 340 to an access node, that in this exemplary embodiment is a gNB 320 comprised in the first network. In other words, the terminal device 310 has an active connection to the gNB 320 and thereby to the first network. The terminal device 310 is simultaneously in a RRC_IDLE or in a RRC_INACTIVE state 342 to a second access node, which in this exemplary embodiment is a gNB 330 that is comprised in the second network. It is to be noted that in some other exemplary embodiments the second access node could be another type of access node such as an eNB.

In this exemplary embodiment, the gNB 320 transmits a message that comprises RRC_Configuration with a default time period for leaving without a notification. In other words, the gNB 320 transmits a message 344 for configuring a MUSIMLeaveTime and this message 344 is received by the terminal device 310. As the terminal device 310 determines 346 to leave the active connection to the first network, the terminal device 310 determines 346 that the active connection is to be switched to the second network. Thus, the terminal device 310 transmits a message 350 to the gNB 320 requesting to leave the active connection to the first network. The message 350 may be a provided using a UE Assistance Information signal that comprises an indication of the terminal device leaving the active connection and a state preference.

Upon receiving the message 350, the gNB 320 determines 352 if the terminal device 310 should wait for longer than the default time period, the MUSIMLeaveTime, before leaving the active connection. In other words, the gNB 320 determines 352 if the default time period for leaving is to be overridden by another condition for leaving, such as a longer time period. As such, upon reception of the UEAssistanceInformation with RRC LEAVE request, the first network may estimate 352 the time that is needed before the terminal device 310 may leave the active connection to the first network. If it is determined 354 that the estimated time is longer than the MUSIMLeaveTime, the gNB 320 may transmit a message 360 that may be an RRCReconfiguration message comprising the overriding condition that in this exemplary embodiment is a new time period for the terminal device 320 to wait before leaving the active connection to the first network. The new time period 358 may thus be the time period that is estimated to be needed for the terminal device 310 to leave the active connection to the first network and may be greater than the default time period for leaving 356. Along with the new time period, also an acknowledgment regarding leaving may be transmitted by the gNB 320 to the terminal device 310 in the message 360. After the terminal device 310 has received the message 360, it may wait for the new time period and after that leave 362 the active connection to the first network without receiving a further message regarding the leaving from the network to the gNB 320.

The exemplary embodiments described above have advantages such as enabling the network to set a small value to the MUSIMLeaveTime timer and thereby save signalling for the majority of cases. Additionally, in case the network needs a terminal device to stay connected for longer than defined as a default value by the MUSIMLeaveTime timer, the network is enabled to postpone, set conditions and/or reject the leaving of the terminal device.

Figure 4:
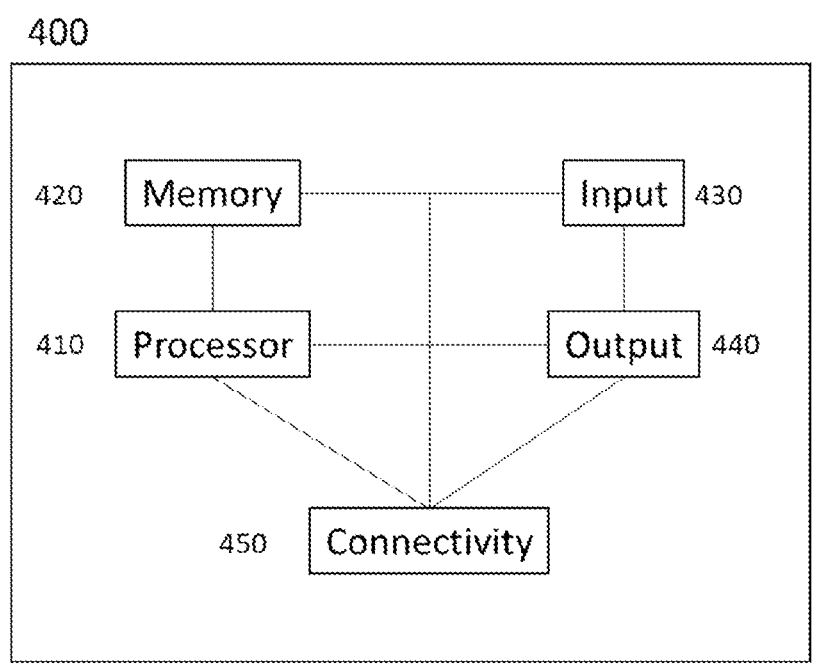
FIG. 4 illustrates an exemplary embodiment of an apparatus.

FIG. 4 illustrates an apparatus 400, which may be an apparatus such as, or comprised in, a terminal device, according to an example embodiment. The apparatus 400 comprises a processor 410. The processor 410 interprets computer program instructions and processes data. The processor 410 may comprise one or more programmable processors. The processor 410 may comprise programmable hardware with embedded firmware and may, alternatively or additionally, comprise one or more application specific integrated circuits, ASICs.

The processor 410 is coupled to a memory 420. The processor is configured to read and write data to and from the memory 420. The memory 420 may comprise one or more memory units. The memory units may be volatile or non-volatile. It is to be noted that in some example embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 420 stores computer readable instructions that are execute by the processor 410. For example, non-volatile memory stores the computer readable instructions and the processor 410 executes the instructions using volatile memory for temporary storage of data and/or instructions.

The computer readable instructions may have been pre-stored to the memory 420 or, alternatively or additionally, they may be received, by the apparatus, via electromagnetic carrier signal and/or may be copied from a physical entity such as computer program product. Execution of the computer readable instructions causes the apparatus 400 to perform functionality described above.

In the context of this document, a "memory" or "computer-readable media" may be any non-transitory media or means that can contain, store, communicate, propagate or transport the instructions for use by or in connection with an instruction execution system, apparatus, or device, such as a computer.

The apparatus 400 further comprises, or is connected to, an input unit 430. The input unit 430 comprises one or more interfaces for receiving a user input. The one or more interfaces may comprise for example one or more motion and/or orientation sensors, one or more cameras, one or more accelerometers, one or more microphones, one or more buttons and one or more touch detection units. Further, the input unit 430 may comprise an interface to which external devices may connect to.

The apparatus 400 also comprises an output unit 440. The output unit comprises or is connected to one or more displays capable of rendering visual content such as a light emitting diode, LED, display, a liquid crystal display, LCD and a liquid crystal on silicon, LCoS, display. The output unit 440 further comprises one or more audio outputs. The one or more audio outputs may be for example loudspeakers or a set of headphones.

The apparatus 400 may further comprise a connectivity unit 450. The connectivity unit 450 enables wired and/or wireless connectivity to external networks. The connectivity unit 450 may comprise one or more antennas and one or more receivers that may be integrated to the apparatus 400 or the apparatus 400 may be connected to. The connectivity unit 450 may comprise an integrated circuit or a set of integrated circuits that provide the wireless communication capability for the apparatus 400. Alternatively, the wireless connectivity may be a hardwired application specific integrated circuit, ASIC.

It is to be noted that the apparatus 400 may further comprise various component not illustrated in the FIG. 4. The various components may be hardware component and/or software components.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising at least one processor, and at least one memory including a computer program code, wherein the at least one memory and the computer program code are configured, with the at least one processor, to cause the apparatus to:
 receive a default time period, wherein the default time period is for allowing the apparatus to consider a request for leaving an active network connection to a first network as accepted by the first network if a response is not received, by the apparatus, from the first network within the default time period;
 determine to leave the active network connection to the first network when having a connection that is idle or inactive to a second network simultaneously with the active connection to the first network;
 transmit a first message, comprising a request regarding the determination to leave the active network connection, to an access node comprised in the first network;
 receive, from the access node, a second message comprising an overriding condition for leaving that replaces the default time period for leaving the active network connection to the first network; and
 leave the active network connection upon meeting the overriding condition for leaving, wherein the overriding condition for leaving, without receiving a third message, which is a message regarding the leaving, comprises a new time period for waiting before leaving, and a further condition for leaving, and the apparatus is caused to leave the active network connection at a time when either one happens first, or at a time when the new time period for leaving has passed and the further condition for leaving is met.

2. The apparatus according to claim 1, wherein the further condition comprises a completion of a mobility procedure.

3. The apparatus according to claim 2, wherein the mobility procedure comprises a pending or a requested handover, or a radio link failure recovery.

4. The apparatus according to claim 1, wherein the second message comprising the overriding condition comprises an aperiodic gap that comprises a condition start of the gap and a fixed end of the gap that is independent of the start of the gap.

5. The apparatus according to claim 4, wherein the aperiodic gap turns to leaving of the active network connection if no message to return to the first network is sent by the apparatus before the end of the gap.

6. The apparatus according to claim 1, wherein the second message comprising the overriding condition comprises an acknowledgment of leaving and the new time period is for waiting before leaving without receiving the third message.

7. The apparatus according to claim 6, wherein the new time period comprises re-interpretation of the default time period.

8. An apparatus comprising at least one processor, and at least one memory including a computer program code, wherein the at least one memory and the computer program code are configured, with the at least one processor, to cause the apparatus to:
 transmit a configuration of a default time period, wherein the default time period is for allowing a terminal device to consider a request for leaving an active network connection to a first network as accepted by the first network if the first network does not send a response within that the default period, to the terminal device;
 receive a first message, from the terminal device, indicating a request to leave the active network connection;
 determine an overriding condition that overrides the default time period for leaving the active network condition; and
 transmit, to the terminal device, a second message comprising the overriding condition, wherein the overriding condition for leaving, without receiving a third message by the terminal device, which is a message regarding the leaving, comprises a new time period for waiting before leaving, and a further condition for leaving, and the overriding condition configures the terminal device to leave the active network connection at a time when either one happens first, or at a time when the new time period for leaving has passed and the further condition for leaving is met.

9. The apparatus according to claim 8, wherein the overriding condition comprises a new time period, the apparatus is further caused to estimate a time period required for the terminal device to leave the active network connection and to determine that the estimated time period is longer, or shorter, than the default time period, and the new time period is the estimated time period.

10. The apparatus according to claim 8, wherein the further condition comprises a completion of mobility procedure.

11. The apparatus according to claim 10, wherein the mobility procedure comprises a pending or a requested handover, or a radio link failure recovery.

12. The apparatus according to claim 8, wherein the apparatus is further caused to determine and transmit, to the terminal device, in the second message comprising the overriding condition an aperiodic gap that comprises a condition start of the gap and a fixed end of the gap that is independent of the start of the gap.

13. The apparatus according to claim 12, wherein the aperiodic gap turns to leaving of the active network connection if no message is received from the terminal device at the end of the gap.

14. The apparatus according to claim 8, wherein the second message comprising the overriding condition comprises an acknowledgment of leaving and the new time period is for waiting before leaving without receiving the third message.

15. The apparatus according to claim 14, wherein the new time period comprises re-interpretation of the default time period.

16. A method comprising:
receiving a default time period, wherein the default time period is for allowing the apparatus to consider a request for leaving an active network connection to a first network as accepted by the first network if a response is not received, by the apparatus, from the first network within the default time period;
determining to leave the active network connection to the first network when having a connection that is idle or inactive to a second network simultaneously with the active connection to the first network;
transmitting a first message, comprising a request regarding the determination to leave the active network connection, to an access node comprised in the first network;
receiving, from the access node, a second message comprising an overriding condition for leaving that replaces the default time period for leaving the active network connection to the first network; and
leaving the active network connection upon meeting the overriding condition for leaving, wherein the overriding condition for leaving, without receiving a third message, which is a message regarding the leaving, comprises a new time period for waiting before leaving, and a further condition for leaving, and the leaving the active network connection is at a time when either one happens first, or at a time when the new time period for leaving has passed and the further condition for leaving is met.

* * * * *